(No Model.)
H. B. SHERIDAN.
ELECTRIC LAMP.
No. 259,223. Patented June 6, 1882.
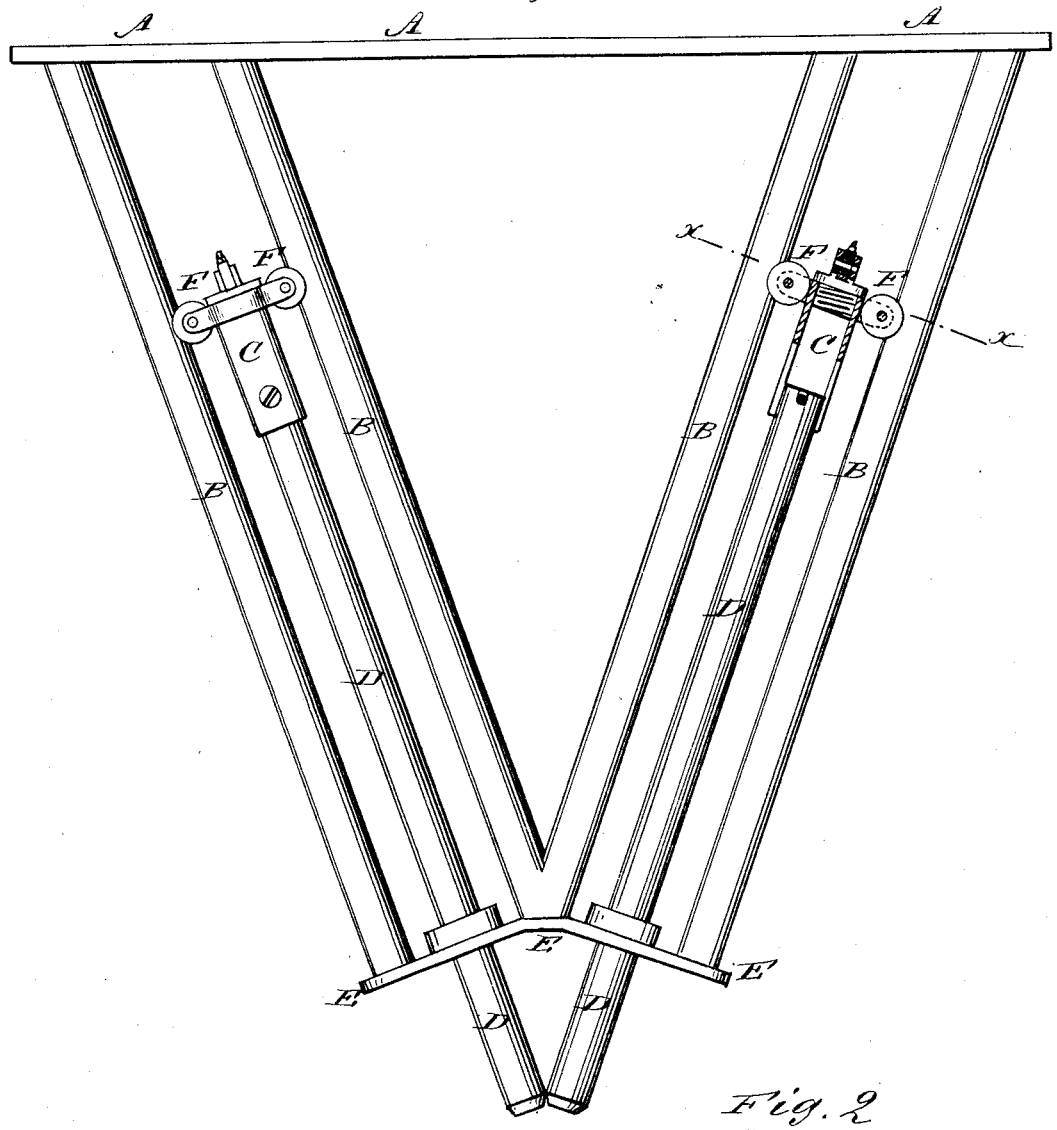
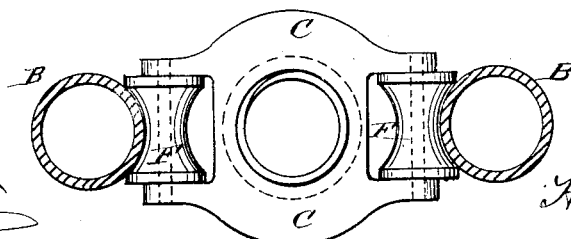
WITNESSES:
C. Neveux
C. Sedgwick
INVENTOR:
H. B. Sheridan
BY Munn & Co.
ATTORNEYS.

UNITED STATES PATENT OFFICE.

HENRY B. SHERIDAN, OF CLEVELAND, OHIO.

ELECTRIC LAMP.

SPECIFICATION forming part of Letters Patent No. 259,223, dated June 6, 1882.

Application filed January 10, 1882. (No model.)

*To all whom it may concern:*

Be it known that I, HENRY B. SHERIDAN, of Cleveland, Cuyahoga county, Ohio, have invented a new and useful Improvement in Electric Lamps, of which the following is a full, clear, and exact description.

Reference is to be had to the accompanying drawings, forming a part of this specification, in which similar letters of reference indicate corresponding parts in both figures.

Figure 1 is a front elevation of my improvement, partly in section. Fig. 2 is a sectional plan view of a part of the same, taken through the line $x\ x$, Fig. 1.

The object of this invention is to promote steadiness and regularity in the movements of the carbons in electric lamps.

The invention consists in carbon-holders constructed with rollers to roll upon guides and cause the carbons to move easily and steadily, and thus maintain a uniform light.

The base-plate A supports the operating mechanism of the electric lamp and the guides B, upon which the holders C for the carbons D move up and down. The guides B are arranged in pairs, and the pairs may be vertical or inclined and converging, as the construction of the lamp may require. The guides B are connected at their lower ends and held in their proper relative positions by a plate, E. The guides B and the plates A and E can be cast in one piece, or they may be made in separate pieces and connected together by soldering, bolts, or other suitable means. In the plate E there are apertures through which the carbons D pass. These apertures are lined with insulating material to prevent the current from passing from one carbon to the other at this point. The ends of the top plates of the carbon-holders C are slotted, and to them, within the said slots, are pivoted rollers F, made of hard rubber or other non-conducting material, so as to insulate the holders C from the guides B. The faces of the rollers F are grooved to fit upon the guides B, and thus keep the holders C in place as they move down and up; or the guides B can be grooved longitudinally upon their inner sides to receive beads or flanges formed upon the faces of the rollers F to keep the holders C in place.

If desired, non-conducting rollers can be pivoted to the bottom plate, E, to guide and insulate the carbons as they pass through the said plate.

With this construction the carbons will move down and up easily, so that they will be affected by the most delicate changes in the operating mechanism, and will thus move steadily and without any jar, and will maintain a uniform light.

Having thus described my invention, I claim as new and desire to secure by Letters Patent—

In an electric lamp, the combination, with the base-plate A, the inclined guides B, and the angular plate E, provided with apertures lined with insulating material, of the carbon-holders C, having the ends of their top plate slotted, and the rollers F, of non-conducting material, pivoted with the said slots, and having their faces grooved to fit upon the said guides, substantially as and for the purpose set forth.

HENRY B. SHERIDAN.

Witnesses:
JAMES T. GRAHAM,
C. SEDGWICK.